United States Patent [19]

Beckingham et al.

[11] 3,991,258

[45] Nov. 9, 1976

[54] CONTROL OF EXOTHERMIC AND ENDOTHERMIC CHEMICAL REACTIONS

[75] Inventors: Brian Francis Beckingham, Welwyn; John Victor Simons, Welwyn Garden City; Brian Norman Hendy, Knebworth, all of England

[73] Assignee: Imperial Chemical Industries Limited, London, England

[22] Filed: June 23, 1975

[21] Appl. No.: 589,394

Related U.S. Application Data

[63] Continuation of Ser. No. 377,192, July 9, 1973, abandoned, which is a continuation of Ser. No. 117,471, Feb. 22, 1971, abandoned.

[52] U.S. Cl. .............................. 526/59; 23/230 A; 235/151.12; 526/60; 526/61; 526/341; 526/342; 526/344; 526/345; 526/346
[51] Int. Cl.$^2$ .................... C08F 2/00; C08F 12/08; C08F 14/06; C08F 20/44
[58] Field of Search .......... 260/95 A, 95 C, 94.9 P, 260/92.8 R, 91.7 R, 88.7 G, 85.5 HC; 23/230 A; 235/151.12, 182; 526/59, 60, 61, 344, 345, 341, 342, 346

[56] References Cited
UNITED STATES PATENTS

| | | | |
|---|---|---|---|
| 3,220,998 | 11/1965 | Berger | 260/94.9 P |
| 3,356,667 | 12/1967 | Smith et al. | 260/94.9 P |
| 3,539,784 | 11/1970 | Woodle | 260/94.9 P |
| 3,558,045 | 1/1971 | Smith et al. | 260/94.9 P |
| 3,594,557 | 7/1971 | Anderson | 260/94.9 P |

FOREIGN PATENTS OR APPLICATIONS

1,186,361   4/1970   United Kingdom ............... 526/61

*Primary Examiner*—Alan Holler
*Attorney, Agent, or Firm*—Cushman, Darby & Cushman

[57] ABSTRACT

A method of measuring the extent of an exothermic chemical reaction while the reaction is proceeding which comprises measuring the difference between the ingoing and outgoing temperatures of a coolant passing through the reaction vessel and computing therefrom the heat produced by the reaction, and in which the numerical value of the temperature of the ingoing coolant is retained in a memory device before being compared with that of the outgoing coolant, the period of retention being equal to the time taken for coolant to pass from the point of measurement of the ingoing temperature to the point of measurement of the outgoing temperature. This corrects errors due to variations with time of the temperature of the ingoing coolant.

24 Claims, 6 Drawing Figures

CONTROL OF EXOTHERMIC AND ENDOTHERMIC CHEMICAL REACTIONS

This is a continuation of application Ser. No. 377,192, filed July 9, 1973, which in turn is a continuation of application Ser. No. 117,471, filed Feb. 22, 1971, both now abandoned.

The invention relates to the control of exothermic and endothermic chemical reactions where the control is dependent on the quantity of heat produced or absorbed by the reaction mixture. In particular, the invention relates to a method of measuring the extent of an exothermic chemical reaction while the reaction is proceeding, which comprises measuring the difference between the ingoing and outgoing temperatures of a coolant passing through the reaction vessel and computing therefrom the heat produced by the reaction. In such calorimetric methods, a coolant is circulated at a known rate through the reaction vessel out of direct contact with the reaction mixture, the temperatures of the ingoing and outgoing coolant being measured and compared to give the quantity of heat removed.

Heat produced during exothermic reactions is generally removed by passing a coolant through the reaction vessel out of direct contact with the reaction mixture, (although some heat will generally also be lost to the surroundings). Since the amount of heat produced is proportional to the amount of reactants added, continuous or regular monitoring of the increase in temperature of the coolant circulating at a known rate readily gives a measure of the progress of the reaction. The rate of addition of further reactants or catalysts, buffers, reaction-modifying agents or other materials as required, may be adjusted to correspond with the rate of reaction. If an integrating device is added, such additions may be made at preselected degrees of reaction.

The determination of the rate of reaction by measuring the temperatures of the ingoing and outgoing coolant, however, is only accurate when the other reaction conditions are constant. These conditions will tend to vary during the process unless sophisticated means are employed to prevent such variations. Thus errors can arise in the computed value of the heat evolved if variations occur in the temperature of the ingoing coolant, because of the dwell time of the coolant, i.e., the time taken for coolant to pass through the reaction vessel. For example, when the temperature of the ingoing coolant falls, the difference between the ingoing and outgoing coolant temperatures when both temperatures are measured simultaneously and then compared gives a computed value of evolved heat greater than the true value. Moreover, where variations in reaction conditions are required, errors will occur during the time between the steady state periods while the reaction conditions are changing. However, such variations may be compensated for corrections made to the computed value of the evolved heat to allow for such variations.

According to the present invention, a method is provided for measuring the extent of exothermic and endothermic chemical reactions while the reactions proceed and for controlling such reactions where the control is dependent on the quantity of heat produced or absorbed by the reaction mixture in which method at least part of the heat produced or absorbed by the reaction mixture is continuously removed or replaced by a heat-exchange medium passing through the reaction vessel at known rate, and measurements are continually made of the ingoing and outgoing temperatures of the heat exchange medium, the numerical value of the ingoing temperature being stored in a memory device for a period equal to the time taken for heat-exchange medium to pass from the point of measurement of the ingoing temperature to the point of measurement of the outgoing temperature and then being compared with the numerical value of outgoing temperature, and the heat produced or absorbed by the reaction mixture is then computed as a function of the product of the measured temperature difference and the heat capacity and rate of flow of the heat-exchange medium, so that control of the reaction may then be effected as required.

We have found in practice, particularly with jacketed reaction vessels and autoclaves fitted with coils through which a coolant is passed, that a change in temperature applied to the ingoing coolant is detected by the outgoing coolant thermometer after a finite time, the "dwell time," for any given rate of coolant flow. The dwell time is in effect the time taken for coolant to pass from the point of measurement of the ingoing temperature to the point of measurement of the outgoing temperature. Thus although the coolant is probably not undergoing plug flow, i.e., flow without mixing along the direction of flow, the behavior of the sytem is such that the present method provides a practical means for correcting errors arising from change in temperature of the ingoing coolant. The dwell time of the coolant will depend on the reaction vessel used and may be determined empirically for any given rate of flow of coolant.

Various forms of apparatus having a memory device may be used to store the ingoing temperatures and later compare these with the outgoing temperatures, and the method of the invention is not restricted to any particular form of apparatus. Thus a computer (e.g., a digital computer) may readily be programmed to carry out the method of the present invention. Although computers may be commercially unacceptable on the grounds of high initial expense where only one reactor is being controlled, they may readily be programmed to control a plurality of reactors operating simultaneously, and the high initial cost may then be commercially justifiable. Further corrections may be applied to the computations of heat evolved as desired in addition to the correction for the dwell time according to the present invention and some of the more relevant further corrections are described hereinbelow. Where computers are used to carry out the method of the present invention, such further corrections as may appear desirable may also be readily incorporated into the computer programme.

However, where the method of control of the present invention is to be applied to a single reactor, a much simpler form of heat meter may be employed, in which the temperature of the ingoing coolant is read into a memory device. After an interval of time, corresponding to dwell time, the stored temperature is compared with the temperature of the outgoing coolant to obtain the rise in temperature of the coolant. With a steady flow of coolant and the temperature rise being measured at intervals of time each observation of temperature rise is equivalent to a finite quantity of heat removed from the reaction vessel, and the observations of temperature rise may therefore be used directly as signals to control the reaction, e.g., by adding further reactant or other materials. Further corrections may also be applied as desired by straightforward modifications to such a heat meter. For example, corrections may be made to the measured temperature rise for variations in the temperature of the reaction mixture or in the temperature of materials being fed to the reactor, for heat generated by the stirrer, for heat lost to the surroundings, or for change in the flow rate of the coolant.

Corrections which may be applied in addition to the dwell time may be summarized as follows:

Heat losses from the reaction mixture to surroundings.

This is proportional to temperature gradient between the vessel walls and the surroundings and is a function of the time elapsed since commencement of the reaction. Several corrections may be applied for one or more parts of the vessel. Mechanical heat input. Heat may be generated by the stirrer, but where the viscosity remains substantially constant, this error is constant with time at constant stirring rate and may be corrected for by the calibration of the system.

Heat content of reactants and the reactor

This is proportional to the temperature and the heat capacity of the materials and the reactor.

Heat content of the coolant and cooling jacket.

This is proportional to the change in temperature (of the coolant) and to the heat capacity of the cooling jacket and the coolant.

Heat content of materials added to the reactor.

This is proportional to the difference between the temperature of reaction mixture and the temperature of the added materials and to their heat capacity. Further corrections may be applied as desired.

A specific embodiment of a heat meter which corrects for the dwell time of the coolant in the reaction vessel, and similar embodiments when adapted to provide corrections for other variables, are described below by way of illustration, with reference to the accompanying drawings.

In the drawings:

FIG. 2 is a block diagram of a heat meter in which errors arising from the dwell time of the heat-exchange medium in the reaction vessel are corrected for.

Figure 1:
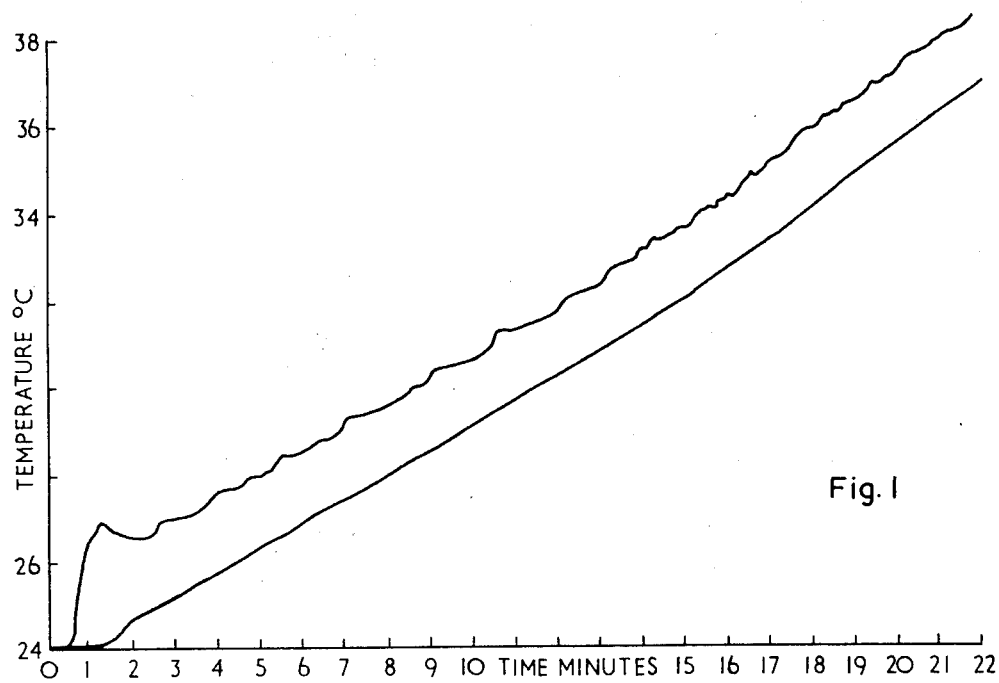
FIG. 1 is a graphical illustration of the temperatures of the ingoing and outgoing coolant (lower and upper curves respectively) in a determination of the dwell time.

In the simplest form of apparatus, the coolant is circulated at a constant rate. The dwell time of the coolant may therefore be determined empirically by circulating the coolant through the reaction vessel, and marking a portion of the coolant. For example, a dye may be injected into the ingoing coolant. The most convenient method, however, is to change the temperature of the ingoing coolant and to plotographically the temperature against time for both the ingoing and outgoing coolants as illustrated in FIG. 1. The shape of the graphs should then be generally similar but separated by a time which is the dwell time.

Figure 2:
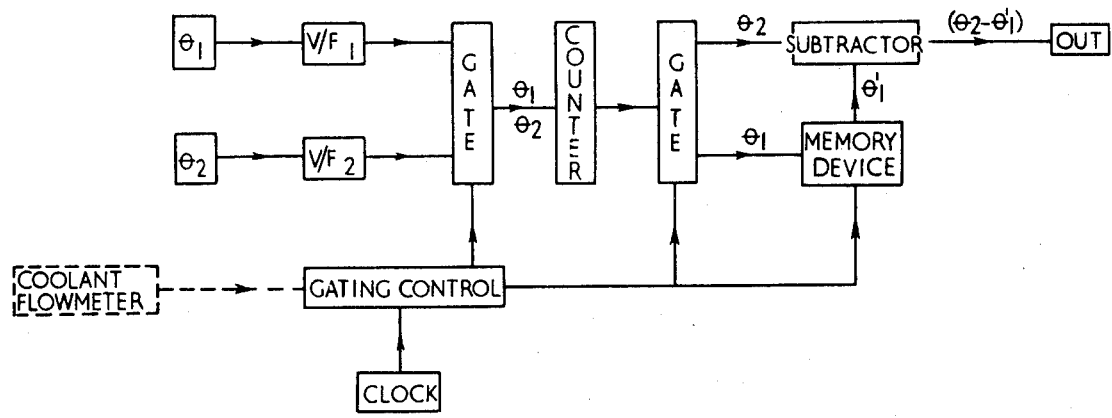

FIG. 2 illustrates a simple form of heat meter which corrects only for the dwell time, and this may be used with a constant rate of flow of coolant. In the heat meter illustrated in FIG. 2, $\theta_1$ and $\theta_2$ are signals from temperature-sensitive transducers in the ingoing and outgoing coolants respectively. Where these signals are in the form of voltages, a voltage-to-frequency converter may be employed in each line, and in FIG. 2 these are shown as $V/F_1$ and $V/F_2$ respectively. The signals from the voltage-to-frequency converters are fed to a counter via a gate, "enabled" by a gating control. (Throughout the specification, the term "enable" has the special meaning customary in the art of computers, that is, "to condition a circuit in such a way as to allow it to operate"). The figure in the counter is then read through another gate into either an electronic unit capable of arithmetic operations (shown as a "subtractor" in FIG. 2) or a memory device, the option being controlled by the second gate and exercised so as to send $\theta_1$ to the memory device and $\theta_2$ direct to the subtractor. The memory device is itself connected to the subtractor to which it sends the retained signal (now shown as $\theta_1'$) and from which an output signal ($\theta_2-\theta_1'$) is derived. The gating control, which controls the overall operation of the meter, has a single time base input connected to a clock, e.g., 1 MHz crystal. Any convenient form of memory device may be employed, a memory core being particularly suitable.

In operation, $\theta_1$ is read into the counter for a predetermined period of time. The figure (conveniently in the form of a binary figure) in the counter is then read into the memory device where it is subsequently stored for a period of time equal to the dwell time of the coolant in the reaction vessel. $\theta_2$ is then read into the counter for the same preset period that was used when counting $\theta_1$. The binary figure in the counter is then applied to the subtractor. The value of $\theta_1$ stored in the memory device ($\theta_1'$) is then fed into the subtractor where it is subtracted from the value of $\theta_2$. The output signal ($\theta_2-\theta_1'$) is then used to actuate any desired control of the reaction or changes required in the reaction mixture.

In order to control the length of time in which $\theta_1$ is stored in the memory device, it is convenient to preset the size of the core according to the measured dwell time of the coolant. The first value of $\theta_1$ is fed into the first position of the memory core, the second value of $\theta_1$ is fed into the second position of the memory core, and so on until the selected number of positions in the core have been filled. The time which has elapsed from the determination of the first value of $\theta_1$ will then be equal to the dwell time of the coolant in the coolant system. The first position of the core is then read into the subtractor and the cycle is then repeated.

Variation in the rate of flow of coolant may readily be corrected for in the meter illustrated in FIG. 2. The flow rate may be readily measured by any of the usual methods such as, for example, the use of an orifice plate, a magnetic flow meter or a turbine flow meter or may be determined by measuring the rate of pumping. The signal from the measuring means for the flow rate may be fed directly to the gating control, most conveniently in the form of a frequency. Thus where the signal is a voltage, a voltage-to-frequency converter may be required. The signals from the measuring means for the flow rate are then used as a time base for the gate control, whereby the rate of sampling $\theta_1$ and $\theta_2$ may be varied to correct for the variations in the flow rate of coolant.

For use in controlling the reaction, the output from the heat meter of FIG. 2 may then be displayed and acted upon manually in accordance with the information displayed to effect any changes required in the reaction mixture, e.g., pumping in reactant or other materials or altering temperatures or pressures or other physical factors. Alternatively, if preferred, such operations may be controlled directly by the output signal ($\theta_2 - \theta_1'$) in a convenient output stage as shown, for example, in FIG. 3.

Figure 3:
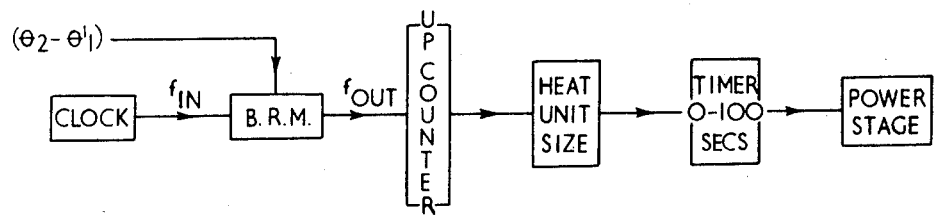
FIG. 3 is a block diagram of a convenient output stage for transmitting the output signal from FIG. 2 to a power stage for carrying out any operation on to the reaction mixture that may be desired.

In the output stage shown in FIG. 3, ($\theta_2-\theta_1'$) from the device shown in FIG. 2 is fed into a binary rate multiplier (B.R.M.) where it is used to modify a frequency ($f_{in}$) derived from a clock. The output frequency of the binary rate multiplier ($f_{out}$) is fed to a unidirectional counter (conveniently called an "up-counter"). The limit of the up-counter is preset manually by an electronic circuit labelled 'Heat Unit Size' in FIG. 3 (and also in FIG. 6). When the number in the up-counter reaches the preset limit a pulse is fed to a timer which in turn feeds the signal to a power stage for a time (e.g., 0–100 seconds) which is preset by the timer. The power stage then carries out any operations to the reaction mixture that may be desired for a period of time as dictated by the timer.

Figure 4:
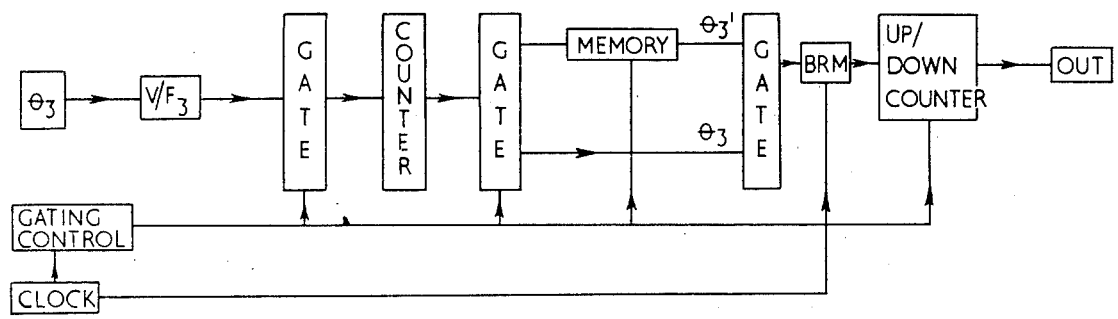
FIG. 4 is a block diagram of a modification applicable to FIG. 2 to correct for variation in the temperature of the reaction mixture (sensible heat correction).

FIG. 4 illustrates a means for incorporating a correction for variation in the temperature of the reaction mixture (the "sensible heat" correction). Where the temperature of reaction mixture increases, some of the heat which would otherwise have been removed by the coolant is used instead in raising the temperature of the reaction mixture. The value obtained for ($\theta_2-\theta_1'$) is therefore to small, and the amount of heat used in raising the temperature of the reaction mixture must then be added to the measured heat evolved. Similarly, where there is a reduction in the temperature of the reaction mixture, the corresponding amount of heat must be subtracted from ($\theta_2-\theta_1'$). In the device illustrated in FIG. 4, $\theta_3$ is a signal indicating the temperature of the reaction mixture. $\theta_3$ is fed to a counter in the manner described for $\theta_1$ and $\theta_2$, and is then fed to a single position in the memory core.

The subsequent signal $\theta_3'$ for the temperature of the reaction mixture and $\theta_3$ are connected in turn to a counter capable of both adding and subtracting operations (conveniently called an "Up/down counter") via a binary rate multiplier (B.R.M.). This counter operates up for $\theta_3$ and down for $\theta_3'$ to obtain the difference ($\theta_3-\theta_3'$) which is added to the value of ($\theta_2-\theta_1'$) derived from the device illustrated in FIG. 4.

Figure 5:
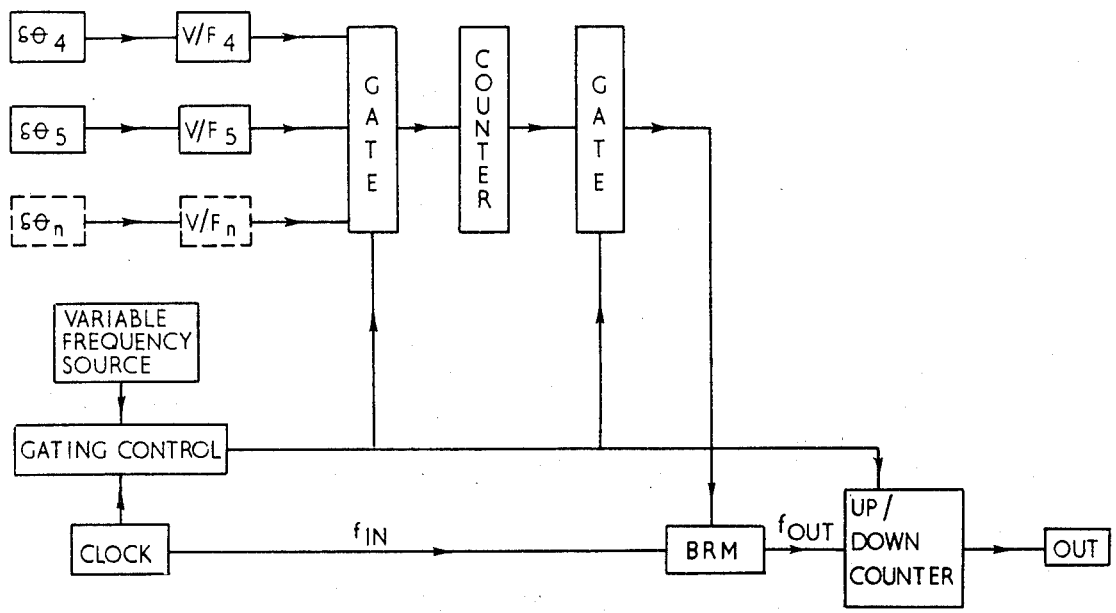
FIG. 5 is a block diagram of a modification applicable to FIG. 2 to incorporate further corrections where such corrections are dependent on the elapsed time.

Other errors may occur which are dependent on the elapsed time, and not on the rate of flow of coolant. For example, where the reaction vessel is maintained at a temperature different from the ambient temperature, there is an interchange of heat between the reaction vessel and its surroundings. Where the temperature difference is constant throughout the reaction, such a heat interchange may be ignored since it is taken into account during the initial calibration of the apparatus. However, in practice the temperature difference will usually fluctuate and is therefore a source of error in the heat measurements. In FIG. 5 means are illustrated for applying corrections for such errors. The input signals are shown as $\delta\theta_4$, $\delta\theta_5$ and $\delta\theta_n$. These terms represent temperature gradients at any part of the system where variations may occur. For example, in a large reaction vessel, it may be convenient to measure the temperature gradient between the reaction mixture and the ambient temperature at several positions. Where these signals are in the form of voltages, a voltage-to-frequency converter may be employed in each line, and in FIG. 5 these are shown as V/F$_4$, V/F$_5$ and V/F$_n$. As before, the various values of $\delta\theta$ are samples for a preset time and are fed through a gate to a counter. The number in the counter may then be fed to a binary rate multiplier (B.R.M.) for modifying a standard frequency ($f_{in}$) obtained from the clock. The output from the binary rate multiplier ($f_{out}$) is then fed to an up/down counter where it is combined with the signal ($\theta_2-\theta_1'$) obtained from the meter of FIG. 2. As in the device of FIG. 4, the up/down counter is used to sum all the terms for feeding to the output stage. Since the errors for which corrections are made in FIG. 5 are dependent on the elapsed time, the time base used for the gating control must be the elapsed time. The clock may be used for this, but since this has a fixed frequency, it is generally more convenient to provide a variable frequency source in order that a selected frequency may be used as the time base, and this has been shown in FIG. 5.

Figure 6:
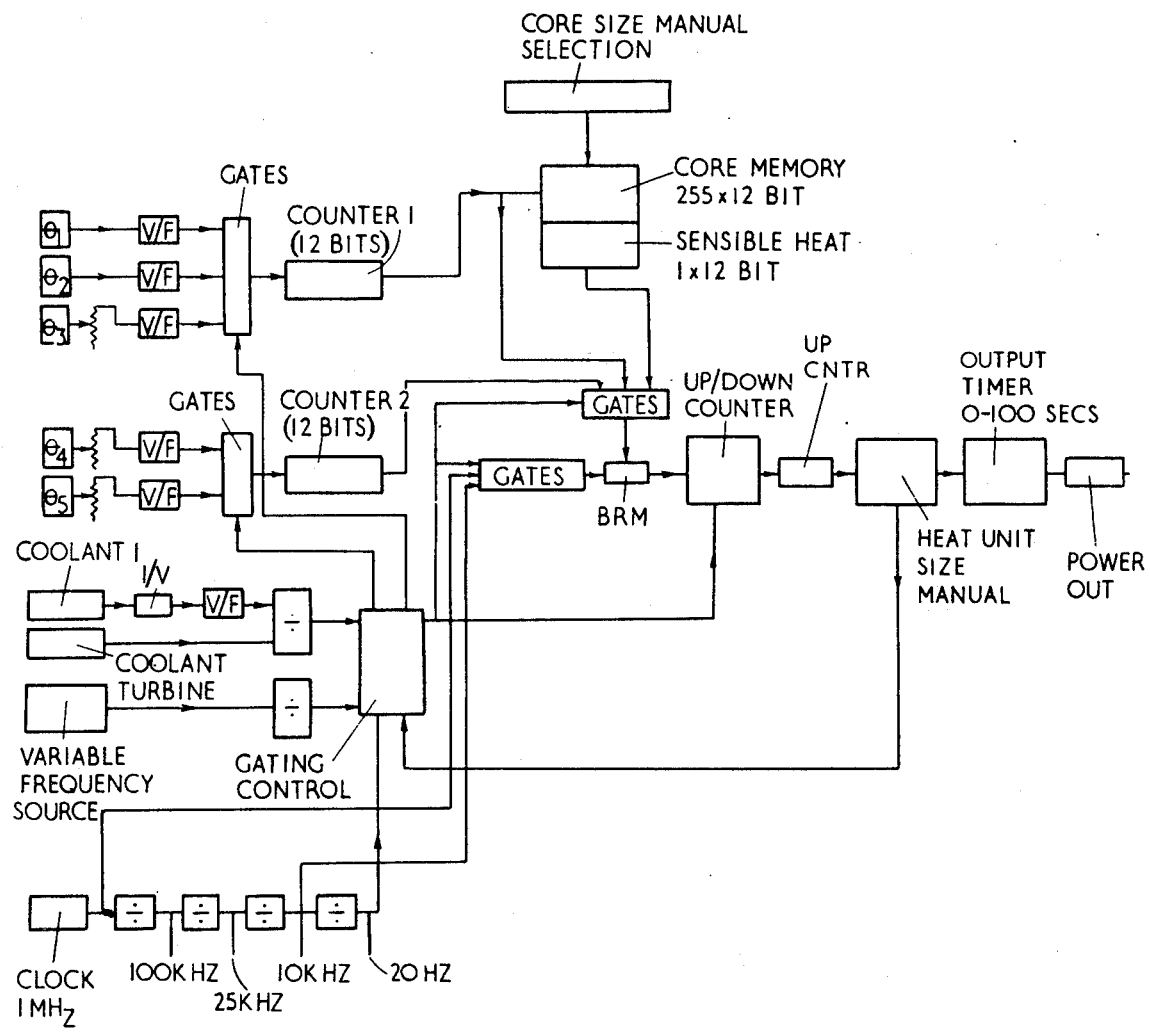
FIG. 6 is a block diagram of heat meter for controlling the rate of reactant feed while applying corrections for the dwell time, change in the flow rate of coolant, the sensible heat correction and other corrections dependent on the elapsed time.

FIG. 6 illustrates a form of heat meter which corrects for the dwell time, change in rate of flow of coolant, the sensible heat and errors dependent on the elapsed time.

In FIG. 6, the outputs ($\theta_1$ to $\theta_5$) from temperature-sensitive transducers are taken to voltage-to-frequency converters.

$\theta_1$ measures the temperature of the ingoing coolant.

$\theta_2$ measures the temperature of the outgoing coolant.

$\theta_3$ measures the temperature of the reaction mixture and this is used to obtain the "sensible heat" correction.

$\theta_4$ measures the difference between the temperature of the reaction mixture and the temperature of the material being added thereto.

$\theta_5$ measures the difference between the temperature of the reaction mixture and ambient temperature.

$\theta_3$ to $\theta_5$ inclusive are connected to voltage-to-frequency converters via potentiometers so that a predetermined weighting factor can be given to these readings.

Measurements of $\theta_1$ and $\theta_2$ are taken at a rate determined by the rate of coolant flow in the vessel. $\theta_3$, $\theta_4$ and $\theta_5$ are sampled at a rate determined by time.

The voltage-to-frequency outputs are taken to amplifiers (not shown in FIG. 6) to produce correctly shaped signals which are acceptable by the rest of the circuits. The outputs of the amplifiers are wired to two gates which are enabled by signals derived from a gating control. The output from each gate goes to a 12-bit binary counter (decimal 4096). The gating control orders the overall working of the system. It has one input from a variable frequency source to provide a time base and another input from a flow meter of either a current of frequency type. The signal from the flow meter then enables $\theta_1$ and $\theta_2$, and the signal from the variable frequency source enables $\theta_3$, $\theta_4$ and $\theta_5$.

The signals into the gating control are synchronized to a clock which is governed by a 1MHz crystal. When a particular gate is enabled, the outputs from the voltage-to-frequency converters are fed into the 12-bit binary counter for a time period of 0.05 second. The output of counter 1 is connected to a memory store with a 256 × 12-bit core and manual adjustment is provided to select the amount of core required for a particular experiment. Thus if the rate of sampling of $\theta_1$ and $\theta_2$ is once every second and the dwell time is 180 seconds, the core size selected would be 180 positions.

The rate at which $\theta_1$ and $\theta_2$ are enabled for any given flow of coolant is manually preset to suit the experiment. For example, if the sequence for the flow-dependent inputs ($\theta_1$ and $\theta_2$) takes 0.40 second and the time taken for reading the other variables into the system on a time base is 0.45 second, the resultant total of 0.85 second is therefore the shortest interval of time at which it is possible to sample the input channels.

The output of the up/down counter is taken to a further unidirectional counter (UP CNTR in FIG. 6) and thence to a circuit which allows for a manual adjustment for heat unit size, and finally to an output timer and a power stage which govern automatically the addition of material to the reaction mixture, conveniently by means of a pneumatic valve. Alternatively, the output from the final unidirectional counter may be read by an operator, with subsequent operations being carried out manually.

The heat meters described herein are suitable for monitoring the progress of any exothermic or endothermic chemical reactions, whether or not the information obtained from the heat meter is used for control of the reaction. Thus, they may, for example, be used as a tool for investigating the kinetics of chemical reactions because they give a measure of the progress of the reaction as the reaction proceeds. They are especially useful in polymer chemistry where monitoring reactions by estimation of reactive chemical species is less easy.

The heat meters described herein may, for example, be used in polymerization reactions in which a gaseous or liquid monomer is fed to a reactor at a controlled rate in order to obtain for example a narrow distribution of molecular weights. In the polymerization of vinyl chloride, for example, the precise timing of the feeding of monomer and additives such as catalysts, retarders, chain-terminators, emulsifiers, dispersing agents or other agents for example, for maximizing the packing density of the polyvinyl chloride or the growth of its particle size, might be determined accurately and related to the actual degree of conversion of vinyl chloride to polyvinyl chloride. The invention is particularly applicable to the polymerization of vinyl chloride alone or with up to 20% by weight of one or more comonomers such as vinyl acetate, vinylidene chloride, alkyl acrylates, ethylene or propylene whether in bulk, suspension or emulsion polymerization.

In the production of copolymers, the rate of addition of the monomers, the rate of increase in the reaction temperature and other similar factors may be controlled and monitored using the heat meters as herein described. Such copolymers whose production may be controlled in this manner may be those formed on the copolymerization of any two or more ethylenically unsaturated monomers, such as a monomer in which the functional ethylenic bond is conjugated to an aromatic ring, as for example in styrene, α-methylstyrene, o-methylstyrene, m-methylstyrene, p-methylstyrene, 2,5-dimethylstyrene, p-methoxystyrene, p-dimethylaminostyrene, p-acetamidostyrene, m-vinylphenol, p-trimethylsilylstyrene, ar-dibromostyrene, 1-vinylnaphthalene, acenaphthalene, 3-vinylphenanthrene, 2-vinylthiophene, indene, coumarone, N-vinylcarbazole or a vinyl pyridine (e.g., 2-methyl-5-vinylpyridine), or a monomer such as vinyl acetate or other vinyl esters, butadiene, isoprene, ethylene, propene, vinyl chloride, vinylidene chloride, vinyl fluoride, vinylidene fluoride, hexafluoropropene, tetrafluoroethylene, chlorotrifluoroethylene, isobutene, 2-methylpent-1-ene or 4-methylpent-1-ene, or a vinyl monomer containing electron withdrawing groups, for examle acrolein methacrolein, acrylonitrile, methacrylonitrile, α-acetoxyacrylonitrile, cinnamonitrile, chloroacrylonitrile, fumaronitrile, maleonitrile, or maleic anhydride, and also alkyl vinyl and alkyl isopropenyl ketones, vinyl ethers and sulphones, e.g., vinyl methyl ether, vinyl ethyl ether and vinyl methyl sulphone. This invention is also applicable to the control of monomer feeding during the "homogeneous" copolymerization of monomers having different rates of copolymerization. In the production of a copolymer, it is not uncommon to find that one of the monomers copolymerizes more readily than the other, with the result that in a conventional batch process, a relatively high proportion of this monomer is incorporated in the polymer formed early in the reaction, leaving a relatively low proportion in the monomer mixture to be incorporated into the polymer later on. Non-homogeneous copolymers produced in this way often have disappointing mechanical properties.

This problem may be overcome by feeding the monomers, or at least that comonomer which has the faster rate of copolymerisation, to the reaction mixture during the course of the reaction, at such a rate that the molar proportions of the monomers in the reaction mixture remain essentially constant. This may conveniently be achieved by charging the reaction mixture with a mixture comprising all the monomer which copolymerizes at the slower rate, together with sufficient of the other monomer to produce initially a copolymer having the desired ratio of monomer units. Further quantities of the monomer having the faster rate of copolymerisation are then fed to the reaction mixture at the rate that the polymerization proceeds, maintaining thereby a constant monomer ratio in the reaction mixture. Where a continuous reaction is required, the monomer feed may comprise the monomers in the proportions desired in the final copolymer. In that case, however, the copolymer produced at the start and the end of the process may not have the same ratio of monomer units as that produced during the remainder of the reaction period. In either case, more than two monomers may be used by adjusting the composition of the monomer feed accordingly.

The invention is particularly applicable to the copolymerization of an ethylenically unsaturated nitrile, such as acrylonitrile or methacrylonitrile, with a smaller molar amount of an aromatic monovinylidene compound, such as for example styrene, a methyl-substituted styrene, vinyl naphthalene, vinyl thiophene, or vinyl pyridine. Thus, for example, to obtain a copolymer of acrylonitrile and styrene containing 80 mole % of acrylonitrile and correspondingly 20 mole % of styrene, the composition of the required monomer mixture is 98.07 mole% acrylonitrile and 1.93 mole% of styrene. The remainder of the styrene must be fed to the reaction mixture as the polymerization proceeds at such a rate that the composition of the reaction mixture remains substantially constant. Because of the very small quantity of styrene which must be maintained in the reaction mixture, accurate control of the rate of monomer feeding is required.

Other comonomer systems in which the method of the present invention may be usefully employed include, for example, the copolymerization of vinyl chloride with a small amount of an N-aryl maleimide, and grafting reactions in which a high proportion of acrylonitrile is copolymerized with a monovinylidene aromatic compound such as styrene, or an alkene such as isobutylene, onto a rubber substrate.

We claim:

1. In a method for measuring the extent at any time of exothermic and endothermic batch reactions in a reaction vessel containing a batch of reaction mixture while the reactions proceed in said reactor and for controlling such reactions where control is dependent on the quantity of heat produced or absorbed by the reaction mixture, the improvement comprising the steps,
   1. continuously removing or replacing at least part of the heat produced or absorbed by the batch of reaction mixture in said vessel by means of a heat-exchange medium going into, sustaining, and then going out of heat-exchanging contact with the contents of the reaction vessel at known rate;
   2. separately and continually measuring the temperatures of the heat-exchange medium as it goes into and as it goes out of heat-exchanging contact;
   3. storing the numerical value of the ingoing temperature in a memory device for a time equal to the time taken for heat-exchange medium to pass from the point of measurement of the ingoing temperature to the point of measurement of the outgoing temperature;
   4. comparing the stored numerical value of the ingoing temperature with the numerical value of the instantaneous outgoing temperature;
   5. computing, from the difference between said stored numerical value of the ingoing temperature and said numerical value of the instantaneous outgoing temperature, the quantity of heat produced or absorbed by the reaction mixture as a function of the product of the measured temperature difference and the heat capacity and the rate of flow of heat-exchange medium and,
   6. calculating from the so computed heat the extent of the reaction at the time of measurement of the outgoing temperature, and
   7. controlling the reaction by addition of at least one reactant when the calculated extent of the reaction reaches a preselected value.

2. A method according to claim 1 in which a correction is made to the computed heat produced or absorbed by the reaction mixture to account for any change in temperature of the reaction mixture.

3. A method according to claim 1 in which the reaction is exothermic.

4. A method according to claim 1 in which the reaction is a polymerization reaction.

5. A method according to claim 4 in which the chemical reaction is a homopolymerization reaction.

6. A method according to claim 4 in which a reactant is vinyl chloride.

7. A method according to claim 4 in which a reactant is acrylonitrile.

8. Polymeric material prepared by the polymerization reaction according to the method of claim 4.

9. In a method for measuring the extent at any time of exothermic and endothermic batch reactions in a reaction vessel containing a batch of reaction mixture while the reactions proceed in said reactor and for controlling such reactions where control is dependent on the quantity of heat produced or absorbed by the reaction mixture, the improvement comprising the steps,
   1. continuously removing or replacing at least part of the heat produced or absorbed by the batch reaction mixture in said vessel by means of a heat-exchange medium going into, sustaining, and then going out of heat-exchanging contact with the contents of the reaction vessel at known rate;
   2. separately and continually measuring the temperatures of the heat-exchange medium as it goes into and as it goes out of heat-exchanging contact;
   3. storing the numerical value of the ingoing temperature in a memory device for a time equal to the time taken for heat-exchange medium to pass from the point of measurement of the ingoing temperature to the point of measurement of the outgoing temperature;
   4. comparing the stored numerical value of the ingoing temperature with the instantaneous numerical value of the outgoing temperature;
   5. computing, from the difference between said stored numerical value of the ingoing temperature and said numerical value of the instantaneous outgoing temperature, the quantity of heat produced or absorbed by the reaction mixture as a function of the product of the measured temperature difference and the heat capacity and the rate of flow of heat-exchange medium and,
   6. calculating from the so computed heat the extent of the reaction and the rate of evolution of heat at the time of measurement of the outgoing temperature, and
   7. controlling the reaction by addition of at least one reactant at a rate determined by the rate of evolution of heat, the amount of reactant added being appropriate to the extent of the reaction.

10. A method according to claim 9 in which a correction is made to the computed heat produced or absorbed by the reaction mixture to account for any change in temperature of the reaction mixture.

11. A method according to claim 9 in which the reaction is exothermic.

12. A method according to claim 9 in which the reaction is a polymerization reaction.

13. A method according to claim 12 in which the chemical reaction is a homopolymerization reaction.

14. A method according to claim 12 in which a reactant is vinyl chloride.

15. A method according to claim 12 in which a reactant is vinylidene chloride.

16. Polymeric material prepared by the polymerization reaction according to the method of claim 12.

17. In a method for measuring the extent at any time of an exothermic batch polymerization reaction of a batch of an ethylenically unsaturated nitrile selected from the group consisting of acrylonitrile and methacrylonitrile and an aromatic vinylidene compound while the reaction proceeds in a reaction vessel containing said batch and controlling the said reaction in accordance with the heat produced by the reaction mixture, the improvement comprising the steps
   1. charging said vessel with a batch of reaction mixture containing quantities of said nitrile and aromatic vinylidene compound calculated to polymerize to a polymer containing at least 80 percent molar of said nitrile monomer,
2. polymerizing said batch of reaction mixture and, during the polymerization, continuously transferring the heat produced into a heat-exchange medium going into, sustaining, and then going out of heat-exchanging contact with the contents of the reaction vessel at known rate,
3. separately and continually measuring the temperatures of said heat exchange medium as it goes into and as it goes out of heat-exchanging contact,
4. storing the numerical value of the ingoing temperature in a memory device for a time equal to the time taken for heat-exchange medium to pass from the point of measurement of the ingoing temperature to the point of measurement of the outgoing temperature,
5. subtracting the stored numerical value of the ingoing temperature from the numerical value of the outgoing temperature,
6. computing the quantity of heat produced by the reaction mixture as a function of the product of the measured temperature difference and the heat capacity and the rate of flow of heat exchange medium,
7. calculating from the so computed heat the extent of the reaction at the time of measurement of the outgoing temperature, and
8. adding to the said batch of reaction mixture quantities of said aromatic vinylidene compound, sufficient, in accordance with the so measured extent of reaction, to maintain a substantially constant ratio of said nitrile to said aromatic vinylidene compound.

18. A method as set forth in claim 17 in which said nitrile is acrylonitrile.

19. In a method for measuring the extent at any time of an exothermic batch polymerization reaction of a batch of an ethylenically unsaturated nitrile selected from the group consisting of acrylonitrile and methacrylonitrile and an aromatic vinylidene compound while the reaction proceeds in a reaction vessel containing said batch and controlling the said reaction in accordance with the heat produced by the reaction mixture, the improvement comprising the steps
1. charging said vessel with a batch of reaction mixture containing quantities of said nitrile and aromatic vinylidene compound calculated to polymerize to a polymer containing at least 80 percent molar of said nitrile monomer,
2. polymerizing said batch of reaction mixture and, during the polymerization, continuously transferring the heat produced into a heat-exchange medium going into, sustaining, and then going out of heat-exchanging contact with the contents of the reaction vessel at known rate,
3. separately and continually measuring the temperatures of said heat exchange medium as it goes into and as it goes out of heat-exchanging contact,
4. storing the numerical value of the ingoing temperature in a memory device for a time equal to the time taken for heat-exchange medium to pass from the point of measurement of the ingoing temperature to the point of measurement of the outgoing temperature,
5. subtracting the stored numerical value of the ingoing temperature from the numerical value of the outgoing temperature,
6. computing the quantity of heat produced by the reaction mixture as a function of the product of the measured temperature difference and the heat capacity and the rate of flow of heat exchange medium,
7. calculating from the so computed heat the extent of the reaction and the rate of evolution of heat at the time of the measurement of the outgoing temperature, and
8. adding to said reaction mixture quantities of said aromatic vinylidene compound, sufficient, in accordance with the so measured extent of reaction and rate of evolution of heat, to maintain a substantially constant ratio of said nitrile to said aromatic vinylidene compound.

20. A method as set forth in claim 19 in which said nitrile is acrylonitrile.

21. A method as set forth in claim 1 including the step of correcting the computed heat produced or absorbed by taking into account heat supplied from extraneous sources or lost extraneously.

22. A method as set forth in claim 9 including the step of correcting the computed heat produced or absorbed by taking into account heat supplied from extraneous sources or lost extraneously.

23. A method as set forth in claim 17 including the step of correcting the computed heat produced or absorbed by taking into account heat supplied from extraneous sources or lost extraneously.

24. A method as set forth in claim 19 including the step of correcting the computed heat produced or absorbed by taking into account heat supplied from extraneous sources or lost extraneously.

* * * * *

UNITED STATES PATENT OFFICE
CERTIFICATE OF CORRECTION

Patent No. 3,991,258     Dated November 9, 1976

Inventor(s) BRIAN BECKINGHAM ET AL

It is certified that error appears in the above-identified patent and that said Letters Patent are hereby corrected as shown below:

Column 4, line 1, "plotographically" should read --plot graphically--;

Column 5, line 40, "therefore to small" should read --therefore too small--.

In the Heading:

The heading should reflect the fact that there is a claim for priority based on British patent application 11387/70, filed in Great Britain on March 10, 1970.

Signed and Sealed this

First Day of February 1977

[SEAL]

Attest:

RUTH C. MASON
*Attesting Officer*

C. MARSHALL DANN
*Commissioner of Patents and Trademarks*